United States Patent [19]

Greenleaf

[11] Patent Number: 4,840,400
[45] Date of Patent: Jun. 20, 1989

[54] GRAVEL SHIELD FOR HITCH TRAVEL TRAILER

[76] Inventor: Eugene F. Greenleaf, 117 W. Wright Pl., Marquette, Mich. 49855

[21] Appl. No.: 92,534

[22] Filed: Sep. 3, 1987

[51] Int. Cl.[4] .............................................. B60R 19/00
[52] U.S. Cl. .................................. 280/770; 293/112; 296/136
[58] Field of Search .............. 280/770, 152 R, 153 R, 280/154, 154.5 R, 155; 180/68.6; 296/136, 188, 191, 194, 199, 35.3; 150/52 K; 293/102, 112, 155, 38

[56] References Cited

U.S. PATENT DOCUMENTS

| | | | |
|---|---|---|---|
| 2,870,833 | 1/1959 | Posnansky | 180/68.6 |
| 3,600,866 | 8/1971 | Griffith | 296/136 |
| 3,831,696 | 8/1974 | Mittendorf et al. | 180/68.6 |
| 3,987,863 | 10/1976 | Mittendorf et al. | 180/68.6 |
| 4,041,999 | 9/1977 | Miller | 296/136 |
| 4,219,218 | 8/1980 | Waldon | 296/136 |
| 4,236,592 | 12/1980 | Ziegler | 180/68.6 |
| 4,322,106 | 3/1982 | Nespor | 296/121 |
| 4,518,191 | 5/1985 | Williams | 180/68.6 |
| 4,627,657 | 12/1986 | Daniels | 180/68.6 |
| 4,639,027 | 1/1987 | Boyd | 280/770 |
| 4,706,991 | 11/1987 | Miller | 280/770 |
| 4,707,009 | 11/1987 | Barnett | 280/770 |

FOREIGN PATENT DOCUMENTS

| | | | |
|---|---|---|---|
| 2543891 | 10/1984 | France | 296/136 |
| 1375886 | 11/1974 | United Kingdom | 280/770 |

*Primary Examiner*—Charles A. Marmor
*Assistant Examiner*—Everett G. Diederiks, Jr.
*Attorney, Agent, or Firm*—Irving M. Weiner; Pamela S. Burt; Roland W. Norris

[57] ABSTRACT

A gravel shield for hitch trailers of the type having a front tongue frame member for hitching to a towing vehicle. The gravel shield includes a lower portion adapted to cooperate with a portion of the tongue frame, an imperforate front sheet and rear cushioning material. The shield is adapted to be operably disposed so as to cover the lower front portion of the trailer so as to protect same from gravel and other road debris during travel.

11 Claims, 1 Drawing Sheet

GRAVEL SHIELD FOR HITCH TRAVEL TRAILER

BACKGROUND OF THE INVENTION

1. Field of the Invention

The present invention relates generally to a gravel shield for protecting the front lower portion of a trailer of the type which is hitched to a vehicle via a tongue frame member. More particularly, the invention relates to a gravel shield adapted to cooperate with the tongue frame member of a travel trailer so as to be disposed above and to the sides of the tongue frame member adjacent the lower front portion of the trailer. The gravel shield includes an imperforate front sheet which protects the trailer from gravel and other road debris, while providing an aesthetic appearance.

2. Description of Relevant Art

One of the problems afflicting users of recreational vehicles such as travel trailers is the damage caused to the front portion of the trailer by flying gravel and other debris during travel. Generally, such travel trailers are desirably maintained so as to have an aesthetically pleasing appearance, and damage caused by such road debris is highly undesirable.

In view of such problem, there has developed a desideratum for a protective member which effectively protects the front portion of the travel trailer from gravel and other such debris, without detracting from the appearance of the trailer.

While various prior attempts have been made to provide protective members for the fronts of vehicles to shield same during travel, none of such attempts are suitable for application to the front of a travel trailer of the aforesaid type. Illustrative ones of such attempts directed towards other types of vehicles are set forth below.

The "Automobile Radiator Heater" disclosed in U.S. Pat. No. 1,391,270 issued in 1921 to O'Daniel comprises a tank device which is fitted to the front of an automobile radiator where it is exposed, such as on an antique vehicle or a tractor. The device heats the coolant in the radiator to prevent freezing even in severe weather, and uses carbon bricks as fuel.

The "Vehicle Insect Protection Apparatus" disclosed in U.S. Pat. No. 3,831,696 issued in 1974 to Mittendorf et al comprises a removably attachable support structure fitted to the front of an automobile and a screen removably attached to the support and the vehicle tire wells. A deflector shield is also provided for deflecting air currents.

The "Vehicle Insect Protection Apparatus" disclosed in U.S. Pat. No. 3,987,863 issued in 1976 to Mittendorf et al comprises a rigid frame at least partially covered with a screen material which prevents the passage of insects therethrough. The frame has a bumper attaching system adapted to fit most vehicle bumpers. A rigid deflector shield may be attached to the front of the rigid frame.

The "Protective Structure for Vehicles" disclosed in U.S. Pat. No. 4,236,592 issued in 1980 to Ziegler comprises an air deflector mounted on the front of a vehicle to deflect air, insects and debris; and a detachable cover depending from the deflector to preclude insects and debris from entering the radiator area. The detachable cover comprises either a non-perforated curtain or a flexible screen.

The "Push Bumper for Two Trucks" disclosed in U.S. Pat. No. 4,322,106 issued in 1982 to Nespor comprises a push bumper apparatus for tow trucks, including a rigid frame having a flat center portion and end portions with a front plate secured over the face of the frame and a back plate secured to the rear of the frame. A headlamp and grill protector is provided at the top of the bumper apparatus.

In contrast to the various prior devices described hereinabove, the present invention provides a gravel shield particularly adapted for fastening to a front portion of a travel trailer having a tongue frame member. When fastened in place, the gravel shield according to the invention effectively protects the front of the travel trailer from gravel and other road debris, while providing an aesthetically pleasing appearance.

SUMMARY OF THE INVENTION

The present invention provides a gravel shield for hitch trailers which comprises a protective plate member having a width dimension approximately equal to the width dimension of a front portion of a hitch trailer to be shielded. The protective plate member includes a lower portion thereof which comprises means for cooperating with a tongue frame portion of the trailer. Fastening means are provided for securing the protective plate member adjacent the front portion of the hitch trailer to be shielded.

In one embodiment of the invention, the means for cooperating with the tongue frame portion comprises a cut-away portion of a lower edge of the protective plate member, the cut-away portion being substantially equal in width to the tongue frame portion of the trailer.

In an alternative embodiment of the invention, the means for cooperating with the tongue frame portion comprises a pair of grooves defined in the lower edge of the protective plate member, the grooves being adapted to respectively closely receive therein a pair of arms of the tongue frame portion.

According to a preferred embodiment of the invention, the protective plate member comprises an imperforate front sheet having a layer of cushioning material affixed to the rear side thereof and a protective edging strip extending along the peripheral edges thereof.

It is an object of the present invention to provide a gravel shield for a travel trailer which is adapted to accommodate a tongue frame portion of the trailer while effectively protecting the lower front portion of the trailer from flying gravel and other road debris during travel.

A further object of the invention is to provide a gravel shield for a travel trailer which effectively protects the lower front portion of the trailer while offering an aesthetically pleasing appearance.

Yet another object of the invention is to provide a gravel shield for a travel trailer which can be fastened to the trailer with ease, can be removed with ease when desired, and is inexpensive to manufacture.

The above and further objects, details and advantages of the invention will become apparent from the following detailed description, when read in conjunction with the accompanying drawings.

DETAILED DESCRIPTION OF PREFERRED EMBODIMENTS

Figure 1:
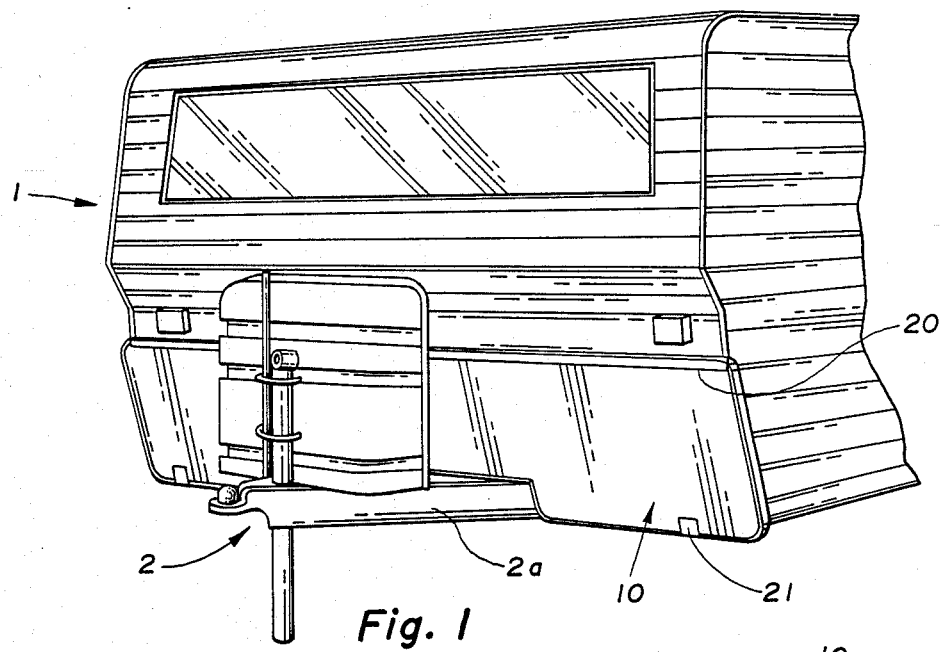
FIG. 1 is a perspective view of a front portion of a travel trailer having a gravel shield according to the invention fastened thereto in operable position.

With reference to FIG. 1, there is depicted a front section of a travel trailer 1 provided in a conventional manner with a tongue frame 2 for use in pulling the trailer via a trailer hitch. Although the trailer 1 is depicted as the enclosed type with a full room defined therein, it is to be understood that the trailer 1 is exemplary. The present invention is also applicable to other types of vehicles designed to be pulled via a trailer hitch and provided with a tongue frame for such purpose.

The tongue frame 2 defines a generally triangular configuration together with the trailer 1 itself, the triangle being defined at the sides by a pair of arm rails 2a and at the rear by a front lower edge portion of trailer 1. The travel trailer 1 is shown in FIG. 1 in a parked state, with a vertical post supporting tongue frame 2 on the ground.

The gravel shield 10 according to the present invention is shown in FIG. 1 in its fastened position on the trailer 1. The means for fastening gravel shield 10 in its operable position on trailer 1 will be described in detail hereinbelow.

Figure 2:
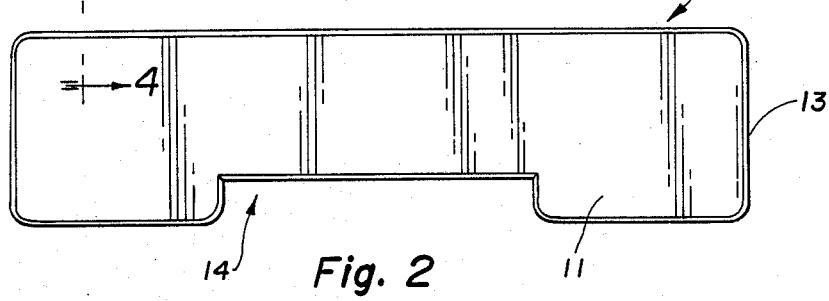
FIG. 2 is a front elevational view of a protective plate member of the gravel shield according to the first embodiment of the invention shown in FIG. 1.

The structure of gravel shield 10 will now be described in detail with reference to FIGS. 2 and 4. As shown in FIG. 2, the gravel shield 10 has a generally rectangular configuration with rounded corners and a lower cut-out portion 14 adapted to cooperate with a portion of tongue frame 2 as described below.

Figure 4:
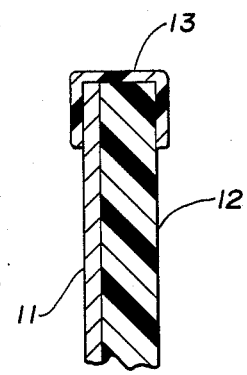
FIG. 4 is a view taken along line 4—4 in FIG. 2.

FIG. 4 shows the preferred construction of gravel shield 10, which includes an imperforate front sheet 11 formed of a material capable of deflecting gravel and other road debris during travel to protect the lower front trailer portion against chipping or denting. By way of example, the front sheet 11 may be fabricated of aluminum, such as a ⅛" sheet or 0.125 gauge aluminum. It will thus be understood that sheet 11 is characterized as a solid unitary plate member having a fixed form adapted to be firmly fixed in place. Alternatively, the front sheet 11 may be fabricated of stainless steel, wood, rubber, acrylic, plexiglass or another imperforate material.

Secured to a rear side of front sheet 11 is a layer of cushioning material 12. Preferably, the cushioning material 12 is adhered to the rear side of front sheet 11 (by glue or other suitable means) so as to be co-extensive therewith. The cushioning material 12 may be formed of a foam material or other similar material, and is adapted to cushion the rear side of gravel shield 10 against the front portion of trailer 1 to prevent damage thereto.

As shown in FIG. 2, a protective edging strip 13, fabricated of vinyl or other suitable material, extends around the entire periphery of gravel shield 10 (including cut-out 14) to protect the edges thereof. FIG. 4 shows edging strip 13 as being U-shaped with the edges of front sheet 11 and cushioning material 12 fitted therein such that a leg of U-shaped strip 13 extends on each side of the edge of gravel shield 10.

The gravel shield 10 as shown in FIG. 2 is preferably dimensioned so as to have approximately the same width of travel trailer 1. In an exemplary embodiment, the width of gravel shield 10 may be approximately 8', with a height of approximately 2'. The cut-out portion 14 is particularly dimensioned so as to closely receive the rear portion of tongue frame 2 therein (see FIG. 1), such that the arm rails 2a are disposed adjacent the sides and top of the cut-out 14. In the exemplary embodiment, the width of cut-out portion may be approximately 42" and the height thereof approximately 6".

It will be understood that the foregoing exemplary dimensions of gravel shield 10 may of course be varied so as to accommodate trailers of various dimensions, while the dimensions of cut-out 14 may likewise be varied to accommodate different-sized tongue frames. Also, in cases where a trailer has other equipment (e.g., brackets, etc.) diposed at the lower front portion thereof, it is contemplated that gravel shield 10 can be provided with additional cut-out portions to accommodate same as needed.

Figure 3:
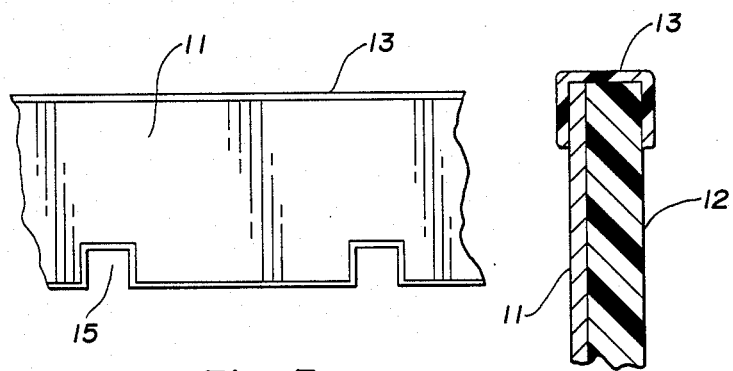
FIG. 3 is a cut-away view of a protective plate member of the gravel shield according to a second embodiment of the invention.

In FIG. 3 there is shown an alternative second embodiment of the invention, wherein gravel shield 10 has substantially the same structure as described hereinabove with respect to FIGS. 2 and 4, except that the lower portion of gravel shield 15 is provided with a pair of grooves 15 instead of cut-out 14. The grooves 15 are dimensioned and spaced so as to respectively closely receive therein the rail arms 2a of tongue frame 2.

The fastening means for fastening gravel shield 10 to the front portion of trailer 1 to be protected are shown in FIG. 1. One portion of the fastening means comprises an elongated U-shaped channel member 20 secured adjacent the front lower portion of trailer 1 to be protected. Preferably, the channel member 20 is fabricated of rubber, vinyl or a similar relatively pliable material, and is secured via hidden screws to trailer 1. If desired, a sealant can be applied along the screw line. The channel member 20 is adapted to securely receive the upper edge of gravel shield 10 therein.

Another portion of the fastening means may comprise a pair of lower clip members 21. The clip members are secured to a lower front edge of the trailer 1 such as to extend outwardly to receive the lower end of gravel shield 10 as shown in FIG. 1, and preferably are adjustably fastened into snug relation to clip gravel shield 10 in a supporting manner. If desired, the clip members 21 can be spring loaded.

In use, the gravel shield 10 is fastened to trailer 1 has follows. First, the upper edge of gravel shield 10 is worked into a secure position within channel member 20. Thereafter, the adjustable clip members 21 are fastened securely against the lower edge portions of gravel shield 10. As thus fastened in operable position, the gravel shield is slightly inclined so as to follow the inclined lower front surface of trailer 1.

When thus positioned on trailer 1, gravel shield 10 functions to effectively protect the lower front portion of the trailer from damage due to gravel and other road debris during travel. In addition, the gravel shield 10 presents an aesthetically pleasing appearance. To further enhance the appearance of gravel shield 10, it is contemplated that the front sheet 11 may be decorated with engravings and/or paintings as desired.

It is also contemplated that gravel shield 10 can be hinged along a middle longitudinal fold-line so that it may be folded in half for storage purposes, if desired.

While there have been described what are at present considered to be the preferred embodiments of the invention, it will be understood that many changes and modifications may be made therein without departing from the scope of the appended claims.

I claim:

1. A gravel shield for hitch trailers, comprising:
   a protective plate member having a solid unitary structure with a fixed form adapted to be firmly fixed in place;
   said protective plate member having a width dimension approximately equal to the width dimension of a front portion of a hitch trailer to be shielded;
   said protective plate member including a lower portion thereof which comprises means for cooperating with a tongue frame portion of said trailer; and
   means for fastening said protective plate member fixedly in place adjacent said front portion of said hitch trailer to be shielded;
   said fastening means comprising:
   a U-shaped channel member adapted to be secured to and extend laterally across essentially the entire front portion of said hitch trailer, said channel member being adapted to securely receive an upper edge portion of said protective plate member therein; and
   at least one pair of spaced clip members, each adapted to be secured adjacent a lower edge of said front portion of said hitch trailer to support a lower edge portion of said protective plate member.

2. A gravel shield according to claim 1, wherein:
   a lower edge of said protective plate member is provided with a cut-out portion approximately equal in width to said tongue frame portion of said trailer; and
   said means for cooperating with said tongue frame portion comprises edge portions of said protective plate member defined at said cut-out portion.

3. A gravel shield according to claim 2, wherein:
   said protective plate member comprises an imperforate front sheet having a layer of cushioning material affixed to the rear side thereof.

4. A gravel shield according to claim 3, wherein:
   said protective plate member further comprises a protective edging strip extending along the peripheral edges of said protective plate member.

5. A gravel shield according to claim 4, wherein:
   said protective edging strip is fabricated of vinyl.

6. A gravel shield according to claim 3, wherein:
   said imperforate front sheet is fabricated of aluminum; and
   said cushioning material comprises a layer of foam material extending coextensively with said rear side of said front sheet.

7. A gravel shield according to claim 3, wherein:
   said imperforate front sheet is fabricated of stainless steel; and
   said cushioning material comprises a layer of foam material extending coextensively with said rear side of said front sheet.

8. A gravel shield according to claim 1, wherein:
   said protective plate member is supported by said fastening means in an inclined manner adjacent an inclined lower front portion of said hitch trailer.

9. A gravel shield according to claim 1, wherein:
   a lower edge of said protective plate member is provided with a pair of grooves adapted to respectively closely receive a pair of arms of said tongue frame portion therein; and
   said means for cooperating with said tongue frame portion comprises edge portions of said protective plate member defined within said grooves.

10. A gravel shield according to claim 9, wherein:
    said protective rigid plate member comprises an imperforate front sheet having a layer of cushioning material affixed to the rear side thereof.

11. A gravel shield according to claim 10, wherein:
    said protective plate member further comprises a protective edging strip extending along the peripheral edges of said protective plate member.

* * * * *